(12) United States Patent
Nkhata

(10) Patent No.: US 12,216,464 B2
(45) Date of Patent: Feb. 4, 2025

(54) AUGMENTED REALITY SYSTEM FOR DIAGNOSING SYSTEM OPERATION

(71) Applicant: Honeywell International Inc., Charlotte, NC (US)

(72) Inventor: James Junior Nkhata, Leicestershire (GB)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 325 days.

(21) Appl. No.: 17/746,613

(22) Filed: May 17, 2022

(65) Prior Publication Data

US 2023/0376025 A1    Nov. 23, 2023

(51) Int. Cl.
G05B 23/02     (2006.01)
G06T 19/00     (2011.01)

(52) U.S. Cl.
CPC ........ *G05B 23/0272* (2013.01); *G06T 19/006* (2013.01)

(58) Field of Classification Search
CPC .......................... G05B 23/0272; G06T 19/006
See application file for complete search history.

(56) References Cited

U.S. PATENT DOCUMENTS

| | | |
|---|---|---|
| 7,649,450 B2 | 1/2010 | Campion, Jr. et al. |
| 8,830,267 B2 | 9/2014 | Brackney |
| 9,846,996 B1 * | 12/2017 | Moore ................. H04L 67/02 |
| 10,297,129 B2 | 5/2019 | Piccolo, III |
| 2013/0301875 A1 * | 11/2013 | Schumacher ......... G06F 3/0346 382/103 |
| 2017/0310541 A1 | 10/2017 | Jin |
| 2020/0394900 A1 | 12/2020 | Lontka et al. |
| 2021/0248732 A1 | 8/2021 | Poluri et al. |

FOREIGN PATENT DOCUMENTS

| | | |
|---|---|---|
| CA | 2895373 A1 | 1/2016 |
| KR | 1409964 B1 | 6/2014 |
| WO | 2020168379 A1 | 8/2020 |

OTHER PUBLICATIONS

Executed European Search Report, European Patent Office, EP Application No. 23171598.8, Sep. 28, 2023 (9 pages).

* cited by examiner

*Primary Examiner* — Elias Desta
(74) *Attorney, Agent, or Firm* — Seager, Tufte & Wickhem, LLP

(57) ABSTRACT

A camera of a mobile device may be used to capture an image of at least part of a component. The component is identified based at least in part on the captured image. Once the component has been identified, the mobile device communicates with a remote server to receive one or more real-time electrical parameter values that correspond to the component. A diagnostic image of the component is displayed on a display of the mobile device, the diagnostic image showing one or more wiring terminals of the component. One or more of the real-time electrical parameter values received from the remote server are superimposed on the diagnostic image, wherein each of the one or more real-time electrical parameter values that is superimposed is positioned adjacent to the corresponding one or more of the wiring terminals.

20 Claims, 13 Drawing Sheets

AUGMENTED REALITY SYSTEM FOR DIAGNOSING SYSTEM OPERATION

TECHNICAL FIELD

The present disclosure relates generally to diagnosing system operation, and more particularly to tools used in diagnosing system operation.

BACKGROUND

In many systems, such as security systems, building management systems and industrial control systems, it may be useful to view system information, status or diagnostics data that pertains to various installed components of the system when diagnosing system operation. For example, it may be helpful for a technician to be able to view information such as voltages, resistances, currents and communication health of selected terminals of the system. In many cases, such information may be directly measured by a technician using a multi-meter or the like. However, this can be time consuming, error prone and tedious. What would be desirable is a method and system that can provide such information to a technician in a more useful and efficient manner.

SUMMARY

This disclosure relates generally to diagnosing system operation, and more particularly to tools used in diagnosing system operation. An example may be found in a method of using a mobile device for diagnosing a system. The mobile device includes a display and a camera. The system includes a component having a plurality of wiring terminals for wiring the component to one or more other components of the system. The system is configured to identify and report to a remote server one or more real-time electrical parameter values that each correspond to one or more of the wiring terminals of the component. The illustrative method includes using the camera of the mobile device to capture an image of at least part of the component, and identifying the component based at least in part on the captured image. Once the component has been identified, the mobile device communicates with the remote server to receive one or more real-time electrical parameter values that correspond to the component. A diagnostic image of the component is displayed on the display of the mobile device, the diagnostic image showing one or more wiring terminals of the component. One or more of the real-time electrical parameter values received from the remote server are superimposed on the diagnostic image and positioned adjacent to the corresponding one or more of the wiring terminals.

Another example is found in a method of using a mobile device for diagnosing a system. The mobile device includes a display and a camera. The system includes a component having a plurality of wiring terminals for wiring the component to one or more other components of the system. The illustrative method includes identifying the component to the mobile device. Once the component has been identified to the mobile device, the mobile device requests and receives one or more electrical parameter values that each correspond to one or more of the wiring terminals of the component. A diagnostic image of the component is displayed on the display of the mobile device, wherein the diagnostic image including one or more wiring terminals of the component. One or more of the electrical parameter values are superimposed on the diagnostic image adjacent to the corresponding one or more of the wiring terminals.

Another example may be found in a method of using a mobile device for diagnosing a system. The mobile device includes a display and a camera. The system including a component having a plurality of wiring terminals for wiring the component to one or more other components of the system. The illustrative method includes identifying the component to the mobile device. Once the component has been identified to the mobile device, the mobile device requests and receives one or more real-time electrical parameter values that each correspond to one or more of the wiring terminals of the component. An augmented reality video feed captured by the camera of the mobile device is displayed on the display of the mobile device. The augmented reality video feed shows one or more wiring terminals of the component with one or more of the real-time electrical parameter values superimposed adjacent to the corresponding one or more of the wiring terminals.

The preceding summary is provided to facilitate an understanding of some of the features of the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following description of various illustrative embodiments of the disclosure in connection with the accompanying drawings, in which.

Figure 1:
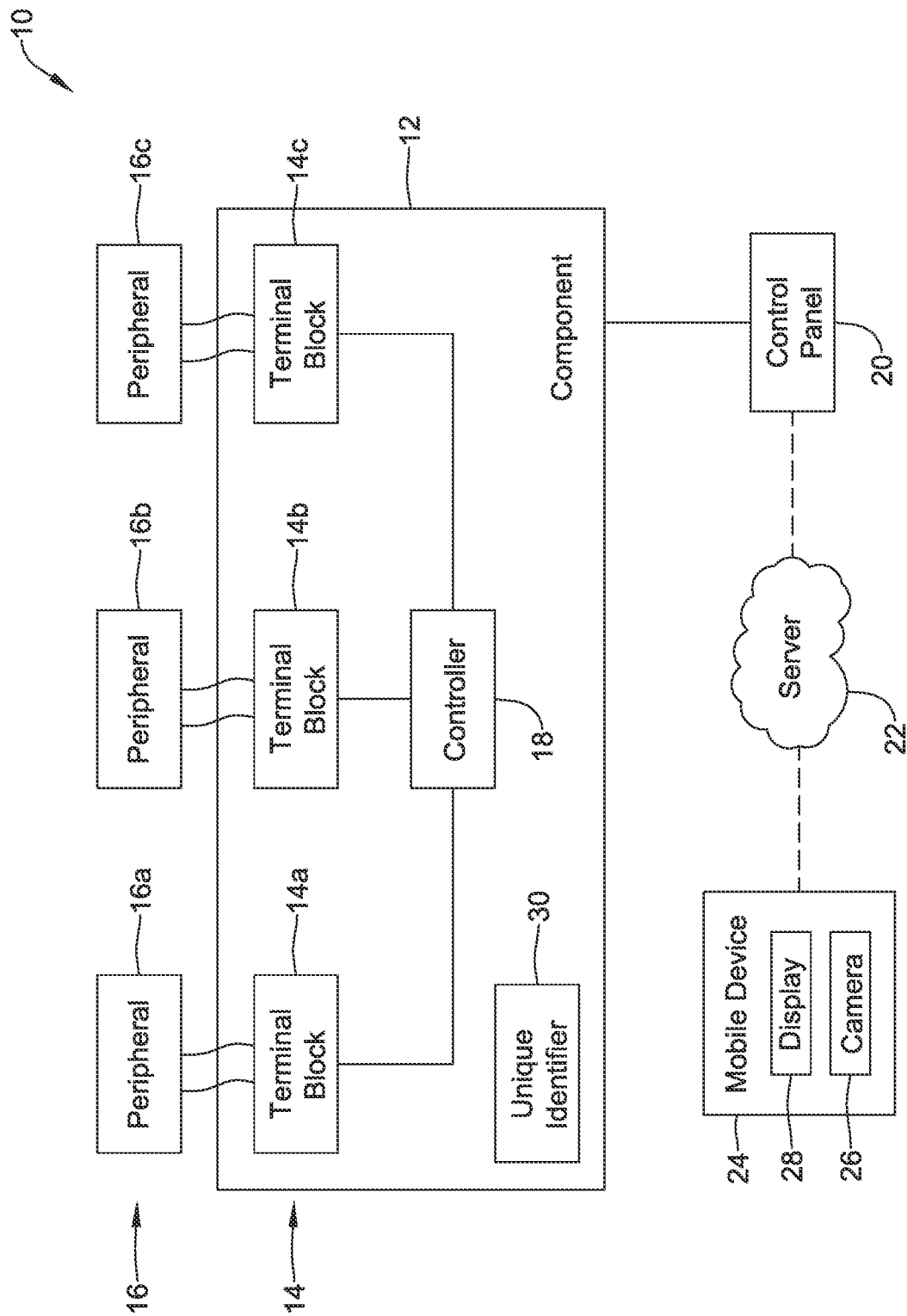
FIG. 1 is a schematic block diagram of an illustrative control system.

While the disclosure is amenable to various modifications and alternative forms, specifics thereof have been shown by way of example in the drawings and will be described in detail. It should be understood, however, that the intention is not to limit aspects of the disclosure to the particular illustrative embodiments described. On the contrary, the intention is to cover all modifications, equivalents, and alternatives falling within the spirit and scope of the disclosure.

DESCRIPTION

The following description should be read with reference to the drawings wherein like reference numerals indicate like elements. The drawings, which are not necessarily to scale, are not intended to limit the scope of the disclosure. In some of the figures, elements not believed necessary to an understanding of relationships among illustrated components may have been omitted for clarity.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic may be applied to other embodiments whether or not explicitly described unless clearly stated to the contrary.

FIG. 1 is a schematic block diagram of an illustrative control system 10. The illustrative control system 10 may be considered as being representative of any of a variety of different control systems. For example, the control system 10 may be part of a building management system. The control system 10 may be part of a Heating, Ventilating and Air Conditioning (HVAC) system. The control system 10 may be part of an industrial process control system. The control system 10 may be part of an intrusion or security system. These are just examples.

The control system 10 includes a component 12. In some cases, the component 12 may represent a control panel that is configured to regulate or control operation of at least part of the control system 10. The component 12 may include a number of terminal blocks 14, individually labeled as 14a, 14b and 14c. While a total of three terminal blocks 14 are shown, it will be appreciated that this is merely illustrative, as the component 12 may include any number of terminals blocks 14, and in some instances may include more or less than three terminal blocks. Each of the terminal blocks 14 may include one or more distinct wiring terminals that are configured to allow a wire to be releasably secured to at least some of the one or more distinct wiring terminals.

In the example shown, the terminal blocks 14 allow a number of peripheral components 16, individually labeled as 16a, 16b and 16c, to be operably coupled to the component 12. While a total of three peripheral components 16 are shown, it will be appreciated that this is merely illustrative, as the control system 10 may include any number of peripheral components 16. In some cases, the control system 10 may include a large number of peripheral components. In some cases, multiple components 12 may be operably coupled in order to provide enough terminal blocks 14 to accommodate all of the peripheral components 16 within the control system 10. In some cases, at least some of the peripheral components 16 may be powered via wires connected to one of the terminal blocks 14. In some cases, at least some of the peripheral components 16 may provide signals to the component 12 via the wires connected to one of the terminal blocks 14.

The peripheral components 16 may represent a variety of different devices. For example, in some cases, at least some of the peripheral components 16 may be sensors. In cases where the control system 10 represents a security system, or is part of a security system, the sensors 16 may include door open sensors, window open sensors, motion sensors such as PIR (passive infrared) sensors, glass break detectors, and others. In an HVAC system, the peripheral components 16 may include temperature sensors, humidity sensors, airflow sensors and others. In some cases, at least some of the peripheral components 16 may be actuators, such as a door release actuator, a damper actuator, a valve actuator and/or any other suitable actuator. These are just examples.

The component 12 may include a controller 18. In some cases, the controller 18 may be configured to control operation of the component 12. This may include providing power to those peripheral components 16 that are wired to a terminal block 14 for power. The controller 18 may be configured to receive signals from at least some of the peripheral components 16, and may control operation of various aspects of those and other peripheral components 16 in accordance with those received signals. In some cases, the component 12 may be operably coupled with a control panel 20, and the control panel 20 may provide commands to the controller 18. In some cases, the component 12 may be the control panel.

In some cases, the control panel 20 (or the component 12) may communicate with a cloud-based server 22. In some cases, operational control of the control system 10 may reside locally, at the edge, such as in the component 12 (and similar components 12) and/or the control panel 20. In some cases, operational control of the control system 10 may reside remotely, in the cloud, such as in the cloud-based server 22. In some instances, the control system 10 may operate in a distributed manner, with some control features manifested locally and some control features manifested remotely.

In some cases, a user may utilize a mobile device 24 in order to obtain information regarding operation of the control system 10. The mobile device 24, which may for example be a tablet, a phablet, or a smartphone, may communicate directly or indirectly with the cloud-based server 22, such as via WiFi, the Internet and/or a cellular network, in order to obtain information from the cloud-based server 22. Because the cloud-based server 22 may be able to obtain operational information from the control panel 20 and/or the component 12, the cloud-based server 22 thus has access to real-time electrical signals received from the component 12 and/or peripheral components 16 and is able to provide this information to the mobile device 24. In some cases, the cloud-based server 22 may have access to previous, or historical, data for examination. In some cases, the mobile device 24 may obtain operational information directly from the control panel 20 and/or the component 12 such as via Bluetooth, thereby removing the need for the cloud-based server 22.

In some instances, the phrase "real-time" need not require that the electrical signals are instantaneously updated. It is contemplated that the phrase "real-time" may include electrical signals that are current to within ten seconds or less, thirty seconds or less, one minute or less, five minutes or less, or ten minutes or less. Real-time electrical signals may include electrical voltage values, electrical current values, electrical resistance values, and/or any other suitable electrical values. It will be appreciated that the controller 18, or the control panel 20, or even the cloud-based server 22, may be configured to interpret some or all of the real-time electrical signals, and will recognize the real-time electrical signals as representing a particular real-world parameter, such as a sensed temperature, a sensed humidity, a sensed motion or the like. These are just examples.

In the example shown, the mobile device 24 includes a camera 26 and a display 28. The camera 26 may be used to take a picture of the component 12 in order to help identify the component 12. In some cases, the mobile device 24 may execute a program that allows identification of the component 12 from a picture taken of the component 12, either from information contained within the mobile device 24, or by sharing the picture taken of the component 12 with the cloud-based server 22. In some cases, a unique identifier 30, may be disposed on the component 12. The unique identifier 30 may be on a sticker, for example, and may include a bar code, a QR code, or an alphanumeric identifier code. In some cases, the unique identifier 30 may be detected within the picture taken of the component 12. In some cases, the user may use the camera 26 of the mobile device 24 to directly take a picture of the unique identifier 30.

It will be appreciated that the display 28, particularly if the mobile device 24 is a smartphone, may be a touch screen display that allows the mobile device 24 to display information for the user as well as to solicit information from the user, and to accept the solicited information from the user. In some cases, the display 28 may be used to display the picture taken of the component 12. In some cases, a diagnostic image of the component 12 may be captured from a video stream captured by the camera 26 showing the component 12. The display 28 may be used to not only display a diagnostic image of the component 12, but also to superimpose thereon at least some of the available real-time electrical parameters available from, for example, the cloud-based server 22.

Figure 2:
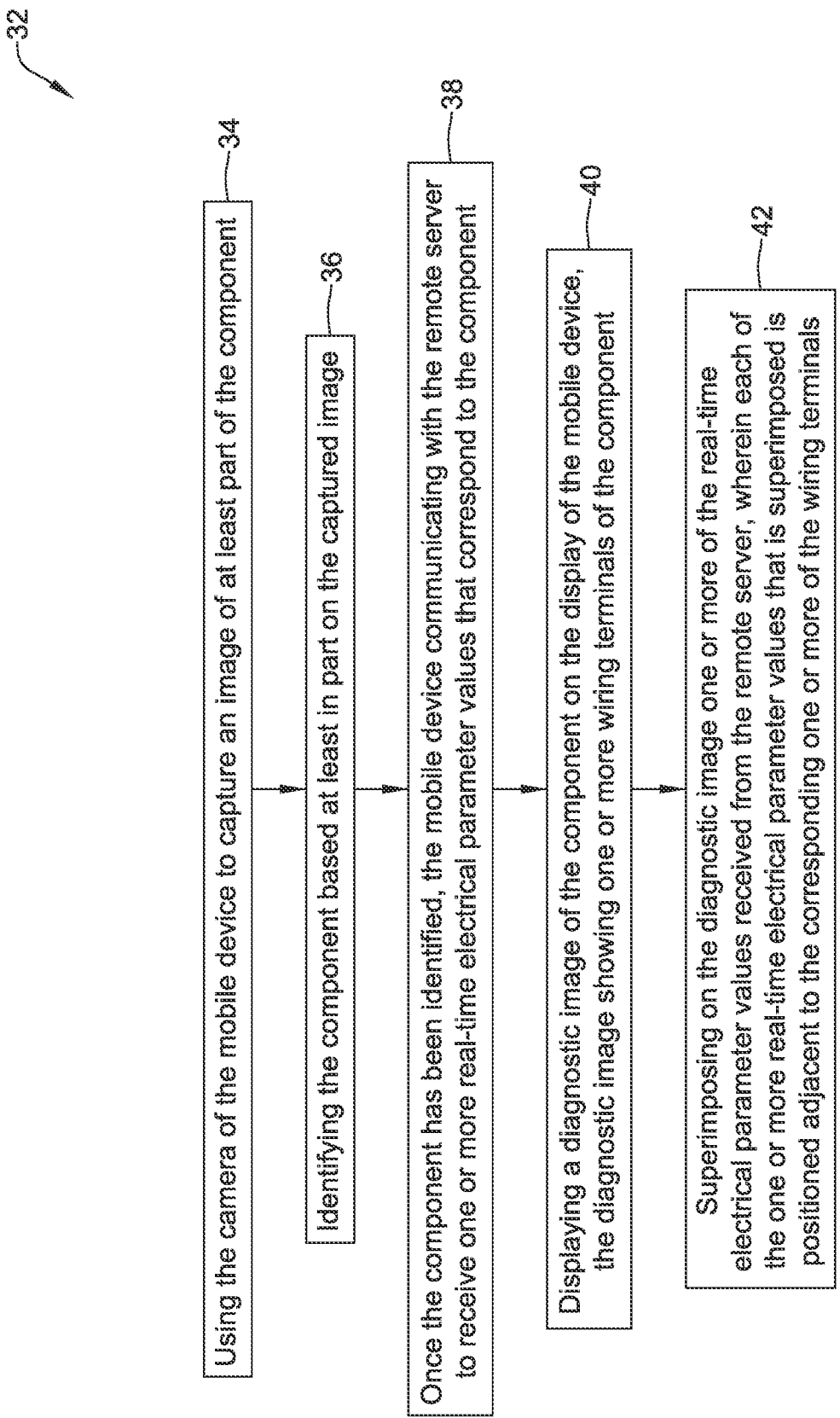
FIG. 2 is a flow diagram showing an illustrative method of using a mobile device to diagnose a system such as the illustrative control system of FIG. 1.

FIG. 2 is a flow diagram showing an illustrative method 32 of using a mobile device (such as the mobile device 24) for diagnosing a system (such as the control system 10). The mobile device includes a display (such as the display 28) and a camera (such as the camera 26). The system includes a component (such as the component 12) having a plurality of wiring terminals (such as the terminal blocks 14) for wiring the component to one or more other components (such as the peripheral components 16) of the system. The system is configured to identify and report to a remote server (such as the cloud-based server 22) one more real-time electrical parameter values that each correspond to one or more of the wiring terminals of the component.

The illustrative method 32 includes using the camera of the mobile device to capture an image of at least part of the component, as indicated at block 34. In some instances, the system includes a security system, and the component may include a security component of the security system. In some cases, using the camera of the mobile device to capture the image of at least part of the component includes capturing an image of a unique identifier (such as the unique identifier 30) that is displayed on the component. In some cases, the unique identifier includes a bar code, a QR code and/or an alphanumeric identifier code. The unique identifier may identify the component Model Number, Serial Number, MAC address and/or any other suitable identifying information. In some cases, the identifying information may be sufficient for the remote server to uniquely identify the component within the overall system 10.

The component is identified based at least in part on the captured image, as indicated at block 36. Once the component has been identified, the mobile device communicates with the remote server to receive one or more real-time electrical parameter values that correspond to the component, as indicated at block 38. At least some of the real-time electrical parameter values may include a real-time electrical resistance value. At least some of the real-time electrical parameter values may include a real-time electrical voltage value. At least some of the real-time electrical parameter values may include a real-time electrical current value. These are just examples.

A diagnostic image of the component is displayed on the display of the mobile device. The diagnostic image may show one or more wiring terminals of the component, as indicated at block 40. One or more of the real-time electrical parameter values received from the remote server are superimposed on the diagnostic image, wherein each of the one or more real-time electrical parameter values that is superimposed is positioned adjacent to the corresponding one or more of the wiring terminals, as indicated at block 42. In some instances, the diagnostic image includes a video frame of a real-time video stream, and the method 32 includes repeating the display and superimposing steps over a plurality of video frames. In some cases, the diagnostic image is a still image, either taken by the camera of the mobile device or a stock image of the particular component.

Figure 3:
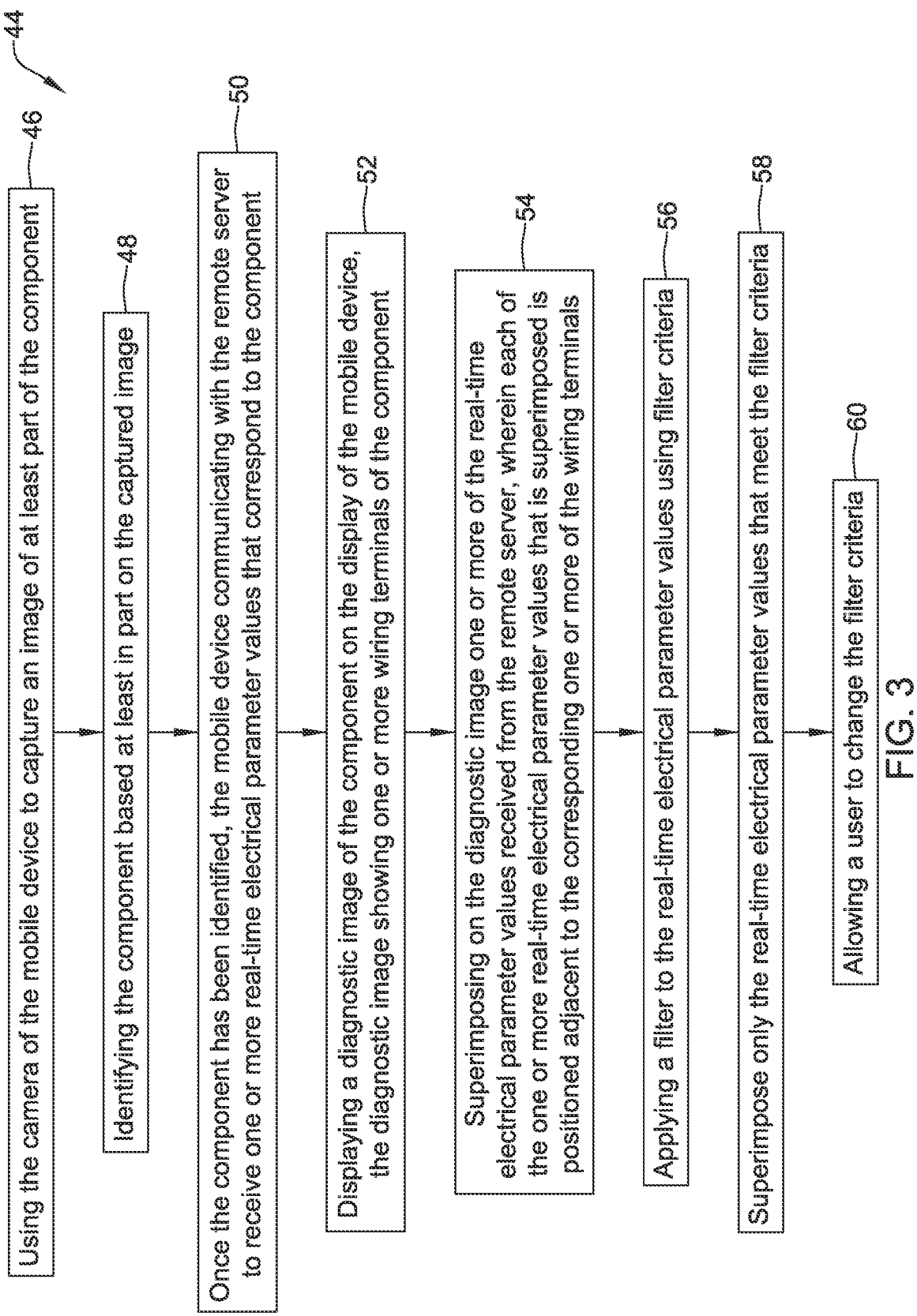
FIG. 3 is a flow diagram showing an illustrative method of using a mobile device to diagnose a system such as the illustrative control system of FIG. 1.

FIG. 3 is a flow diagram showing an illustrative method 44 of using a mobile device (such as the mobile device 24) for diagnosing a system (such as the control system 10). The mobile device includes a display (such as the display 28) and a camera (such as the camera 26). The system includes a component (such as the component 12) having a plurality of wiring terminals (such as the terminal blocks 14) for wiring the component to one or more other components (such as the peripheral components 16) of the system. The system is configured to identify and report to a remote server (such as the cloud-based server 22) one more real-time electrical parameter values that each correspond to one or more of the wiring terminals of the component.

The illustrative method 44 includes using the camera of the mobile device to capture an image of at least part of the component, as indicated at block 46. In some instances, the system includes a security system, and the component may include a security component of the security system. In some cases, using the camera of the mobile device to capture the image of at least part of the component includes capturing an image of a unique identifier (such as the unique identifier 30) that is displayed on the component. In some cases, the unique identifier includes a bar code, a QR code and/or an alphanumeric identifier code. The unique identifier may identify the component Model Number, Serial Number, MAC address and/or any other suitable identifying information. In some cases, the identifying information may be sufficient for the remote server to uniquely identify the component within the overall system 10.

The component is identified based at least in part on the captured image, as indicated at block 48. Once the component has been identified, the mobile device communicates with the remote server to receive one or more real-time electrical parameter values that correspond to the component, as indicated at 50. At least some of the real-time electrical parameter values may include a real-time electrical resistance value. At least some of the real-time electrical parameter values may include a real-time electrical voltage value. At least some of the real-time electrical parameter values may include a real-time electrical current value. These are just examples.

A diagnostic image of the component is displayed on the display of the mobile device. The diagnostic image shows one or more wiring terminals of the component, as indicated at block 52. One or more of the real-time electrical parameter values received from the remote server are superimposed on the diagnostic image, wherein each of the one or more real-time electrical parameter values that is superimposed is positioned adjacent to the corresponding one or more of the wiring terminals, as indicated at block 54. In some instances, the diagnostic image includes a video frame of a real-time video stream, and the method 44 includes repeating the display and superimposing steps over a plurality of video frames. In some cases, the diagnostic image is a still image, either taken by the camera of the mobile device or a stock image of the particular component.

In some cases, the method 44 may further include applying a filter to the real-time electrical parameter values using filter criteria, as indicated at block 56. Only the real-time electrical parameter values that meet the filter criteria are superimposed, as indicated at block 58. In some cases, the method 44 may further include allowing a user to change the filter criteria, as indicated at block 60. The filter criteria may include, for example, displaying electrical information of only certain types such as electrical voltage information, electrical resistance information, and/or electrical current information. Alternatively, or in addition, the filter criteria may include, for example, displaying electrical information for only certain terminal types such as power terminals, signal terminals, or communication terminals. These are just examples.

Figure 4:
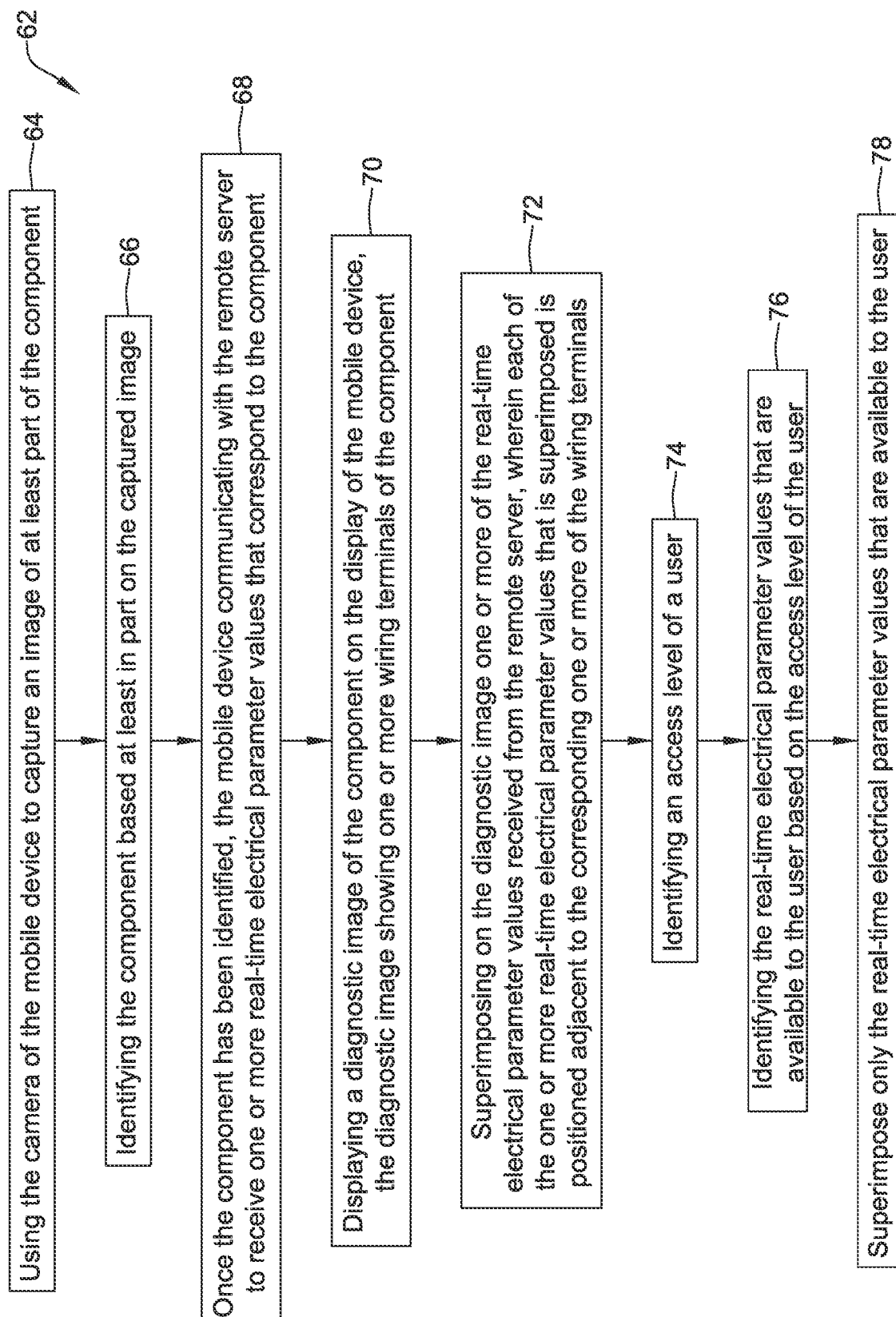
FIG. 4 is a flow diagram showing an illustrative method of using a mobile device to diagnose a system such as the illustrative control system of FIG. 1.

FIG. 4 is a flow diagram showing an illustrative method 62 of using a mobile device (such as the mobile device 24) for diagnosing a system (such as the control system 10). The mobile device includes a display (such as the display 28) and a camera (such as the camera 26). The system includes a component (such as the component 12) having a plurality of wiring terminals (such as the terminal blocks 14) for wiring the component to one or more other components (such as the peripheral components 16) of the system. The system is configured to identify and report to a remote server (such as the cloud-based server 22) one more real-time electrical parameter values that each correspond to one or more of the wiring terminals of the component.

The illustrative method 62 includes using the camera of the mobile device to capture an image of at least part of the component, as indicated at block 64. In some instances, the system includes a security system, and the component may include a security component of the security system. In some cases, using the camera of the mobile device to capture the image of at least part of the component includes capturing an image of a unique identifier (such as the unique identifier 30) that is displayed on the component. In some cases, the unique identifier includes a bar code, a QR code and/or an alphanumeric identifier code. The unique identifier may identify the component Model Number, Serial Number, MAC address and/or any other suitable identifying information. In some cases, the identifying information may be sufficient for the remote server to uniquely identify the component within the overall system 10.

The component is identified based at least in part on the captured image, as indicated at block 66. Once the component has been identified, the mobile device communicates with the remote server to receive one or more real-time electrical parameter values that correspond to the component, as indicated at block 68. At least some of the real-time electrical parameter values may include a real-time electrical resistance value, a real-time electrical voltage value and/or a real-time electrical current value.

A diagnostic image of the component is displayed on the display of the mobile device. The diagnostic image shows one or more wiring terminals of the component, as indicated at block 70. One or more of the real-time electrical parameter values received from the remote server is superimposed on the diagnostic image, wherein each of the one or more real-time electrical parameter values that is superimposed is positioned adjacent to the corresponding one or more of the wiring terminals, as indicated at block 72. In some instances, the diagnostic image includes a video frame of a real-time video stream, and the method 62 includes repeating the display and superimposing steps over a plurality of video frames. In some cases, the diagnostic image is a still image, either taken by the camera of the mobile device or a stock image of the particular component.

In some instances, the method 62 may further include identifying an access level of a user, as indicated at block 74. The real-time electrical parameter values that are available to the user based on the access level of the user are identified, as indicated at block 76. Only the real-time electrical parameter values that are available to the user are superimposed, as indicated at block 78.

Figure 5:
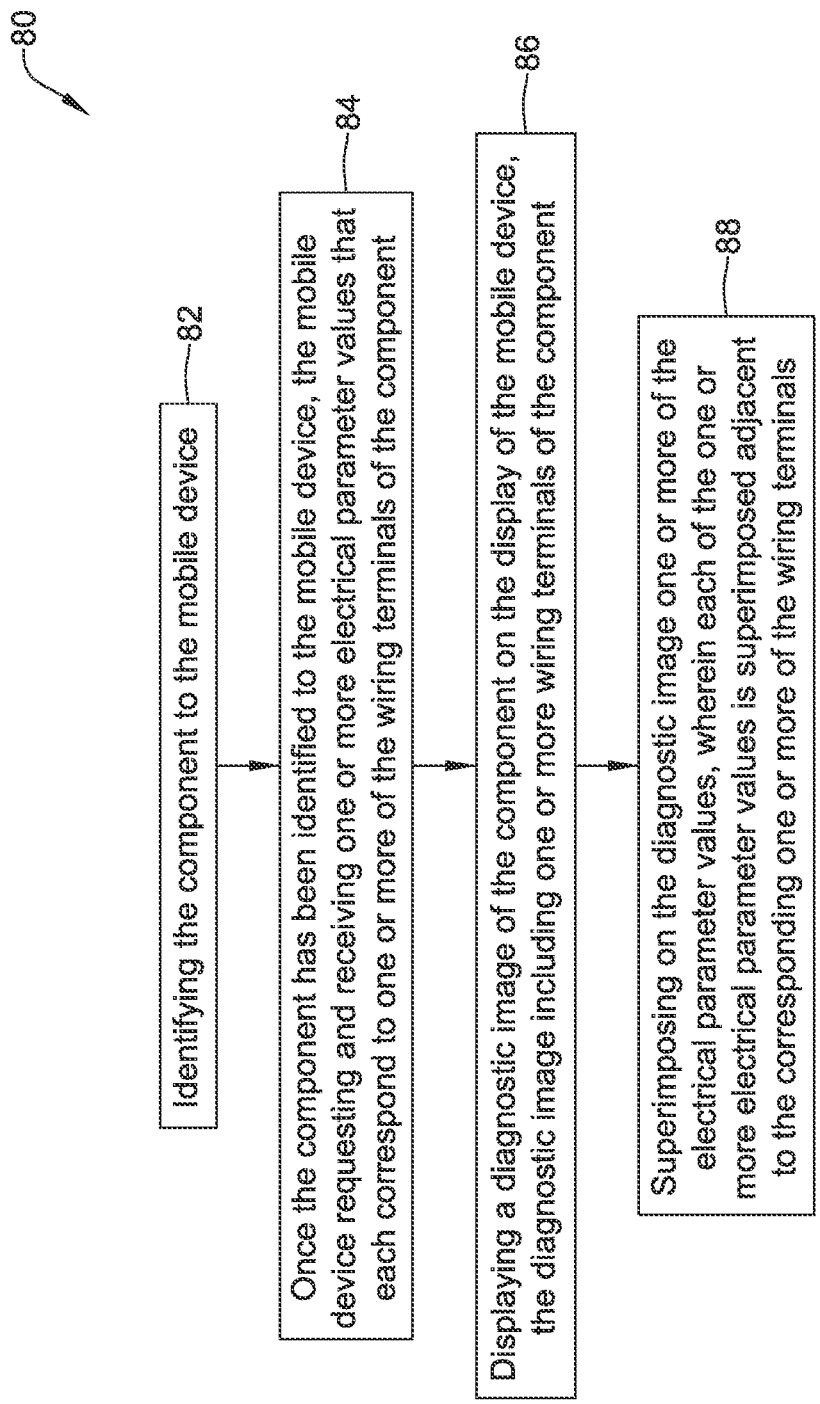
FIG. 5 is a flow diagram showing an illustrative method of using a mobile device to diagnose a system such as the illustrative control system of FIG. 1.

FIG. 5 is a flow diagram showing an illustrative method 80 of using a mobile device (such as the mobile device 24) for diagnosing a system (such as the control system 10). The mobile device includes a display (such as the display 28) and a camera (such as the camera 26). The system includes a component (such as the component 12) having a plurality of wiring terminals (such as the terminal blocks 14) for wiring the component to one or more other components (such as the peripheral components 16) of the system. The illustrative method 80 includes identifying the component to the mobile device, as indicated at block 82.

Once the component has been identified to the mobile device, the mobile device requests and receives one or more electrical parameter values that each correspond to one or more of the wiring terminals of the component, as indicated at block 84. At least some of the electrical parameter values may include a real-time electrical resistance value, a real-time electrical voltage value and/or a real-time electrical current value.

In some cases, the mobile device requests and receives the one or more electrical parameter values that each correspond to one or more of the wiring terminals of the component from a remote server (such as the cloud-based server 22). In some cases, the mobile device requests and receives the one or more electrical parameter values that each correspond to one or more of the wiring terminals of the component from the component via a wired or wireless (e.g. Bluetooth) connection with the component. In some cases, the mobile device requests and receives the one or more electrical parameter values that each correspond to one or more of the wiring terminals of the component from another component of the system.

A diagnostic image of the component is displayed on the display of the mobile device. The diagnostic image includes (i.e. show) one or more wiring terminals of the component, as indicated at block 86. One or more of the electrical parameter values are superimposed on the diagnostic image, wherein each of the one or more electrical parameter values is superimposed adjacent to the corresponding one or more of the wiring terminals, as indicated at block 88.

Figure 6:
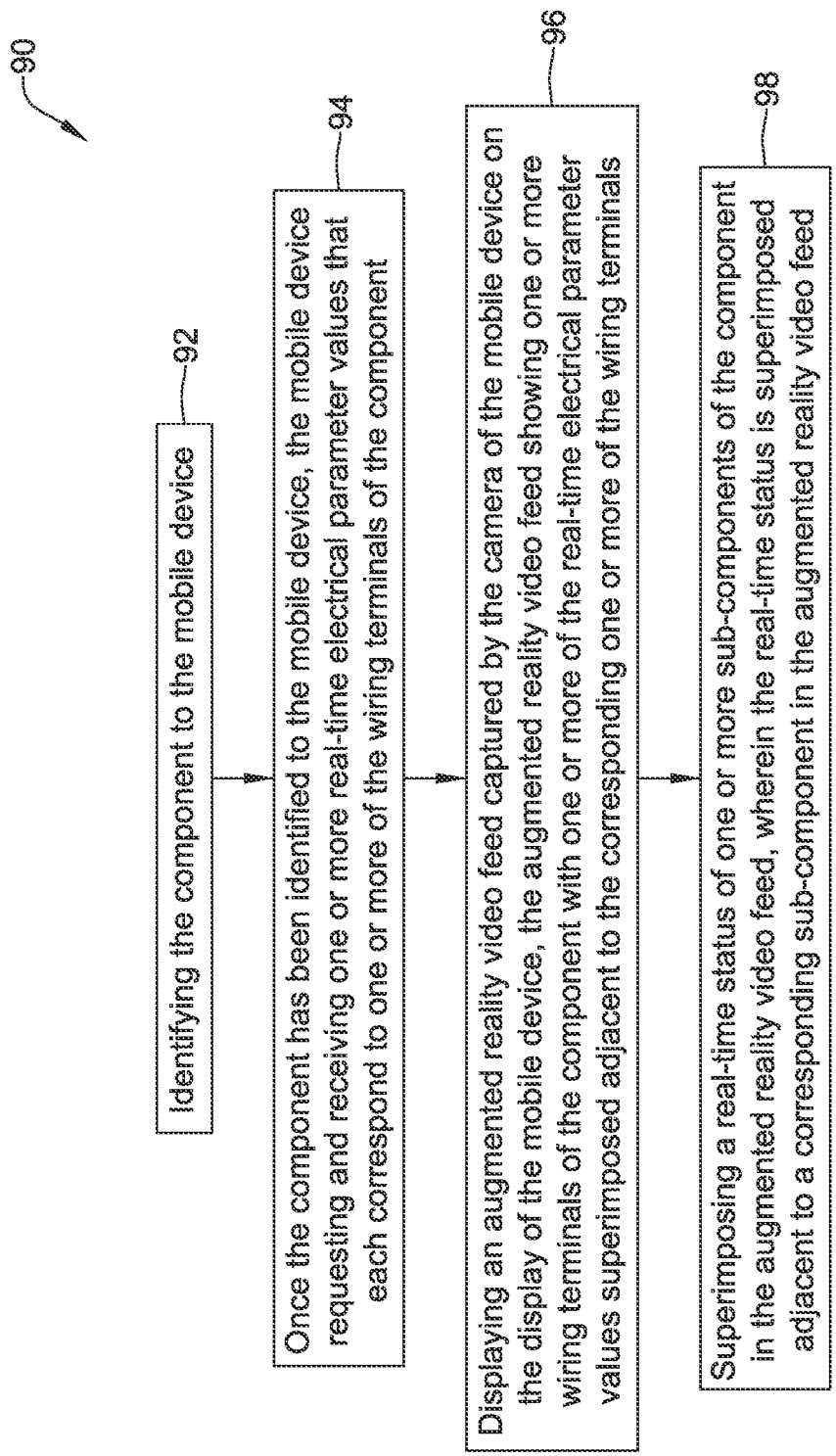
FIG. 6 is a flow diagram showing an illustrative method of using a mobile device to diagnose a system such as the illustrative control system of FIG. 1.

FIG. 6 is a flow diagram showing an illustrative method 90 of using a mobile device (such as the mobile device 24) for diagnosing a system (such as the control system 10). The mobile device includes a display (such as the display 28) and a camera (such as the camera 26). The system includes a component (such as the component 12) having a plurality of wiring terminals (such as the terminal blocks 14) for wiring the component to one or more other components of the system. The illustrative method includes identifying the component to the mobile device, as indicated at block 92. Once the component has been identified to the mobile device, the mobile device requests and receives one or more real-time electrical parameter values that each correspond to one or more of the wiring terminals of the component, as indicated at block 94.

In some cases, an augmented reality video feed captured by the camera of the mobile device is displayed on the display of the mobile device. The augmented reality video feed shows one or more wiring terminals of the component with one or more of the real-time electrical parameter values superimposed adjacent to the corresponding one or more of the wiring terminals, as indicated at block 96. In some cases, the method 90 may further include superimposing a real-time status of one or more sub-components of the component in the augmented reality video feed, wherein the real-time status is superimposed adjacent to a corresponding sub-component in the augmented reality video feed, as indicated at block 98. For example, real time status information of a communications sub-component may be superimposed on the augmented reality video feed (e.g. on-line, off-line, signal strength, signal-to-noise ratio (SNR), error rate, channel utilization, number of collisions, number of retries, etc.). Likewise, real time status information of a processing sub-component may be superimposed on the augmented reality video feed (e.g. percent processor utilization, percent memory utilization, etc.). It is further contemplated that fault and/or other diagnostic information may be superimposed on the augmented reality video feed, as desired.

Figure 7:
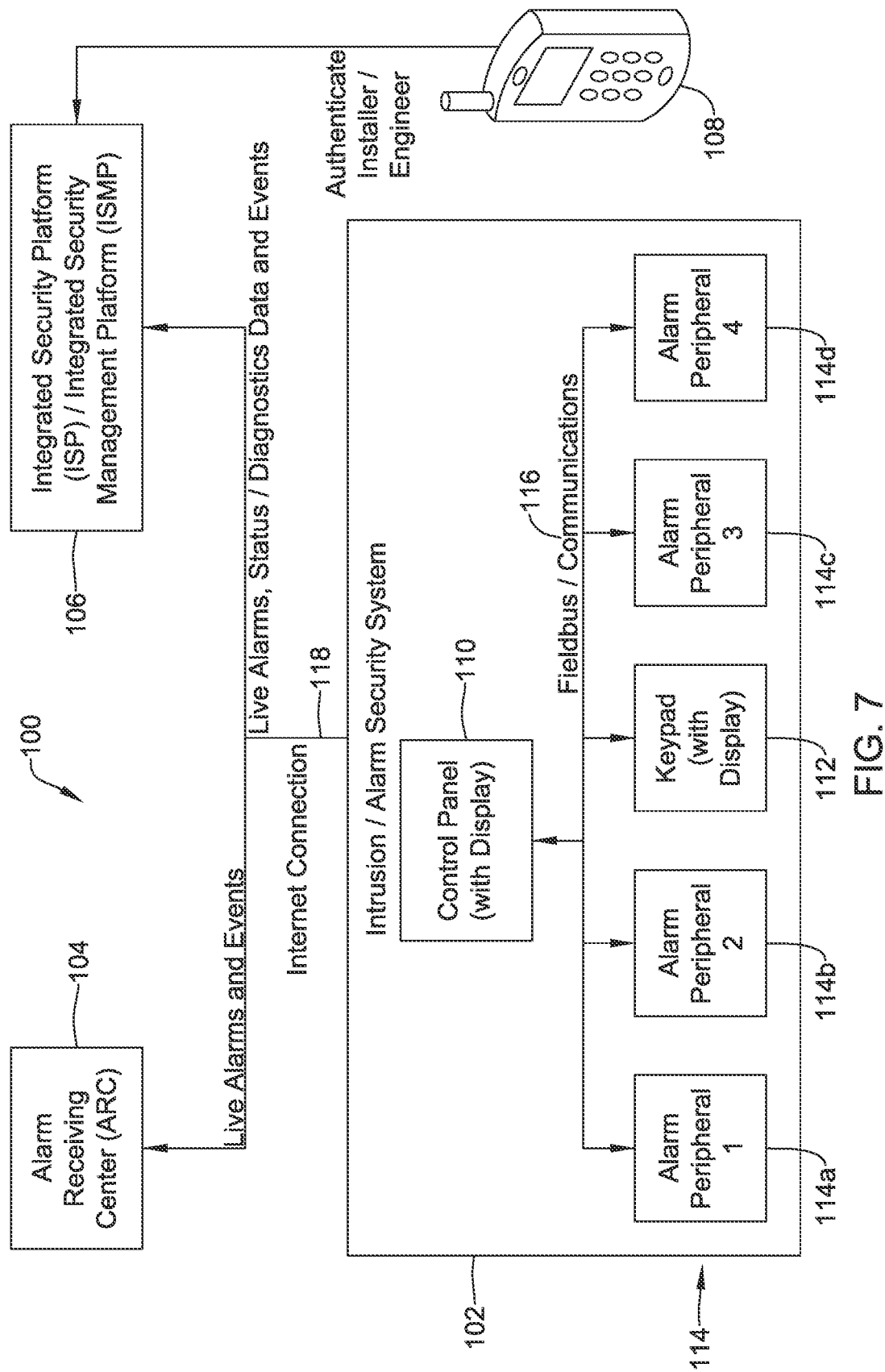
FIGS. 7 through 9 provide a step-by-step example of using a mobile device to diagnose a system.
Figure 8:
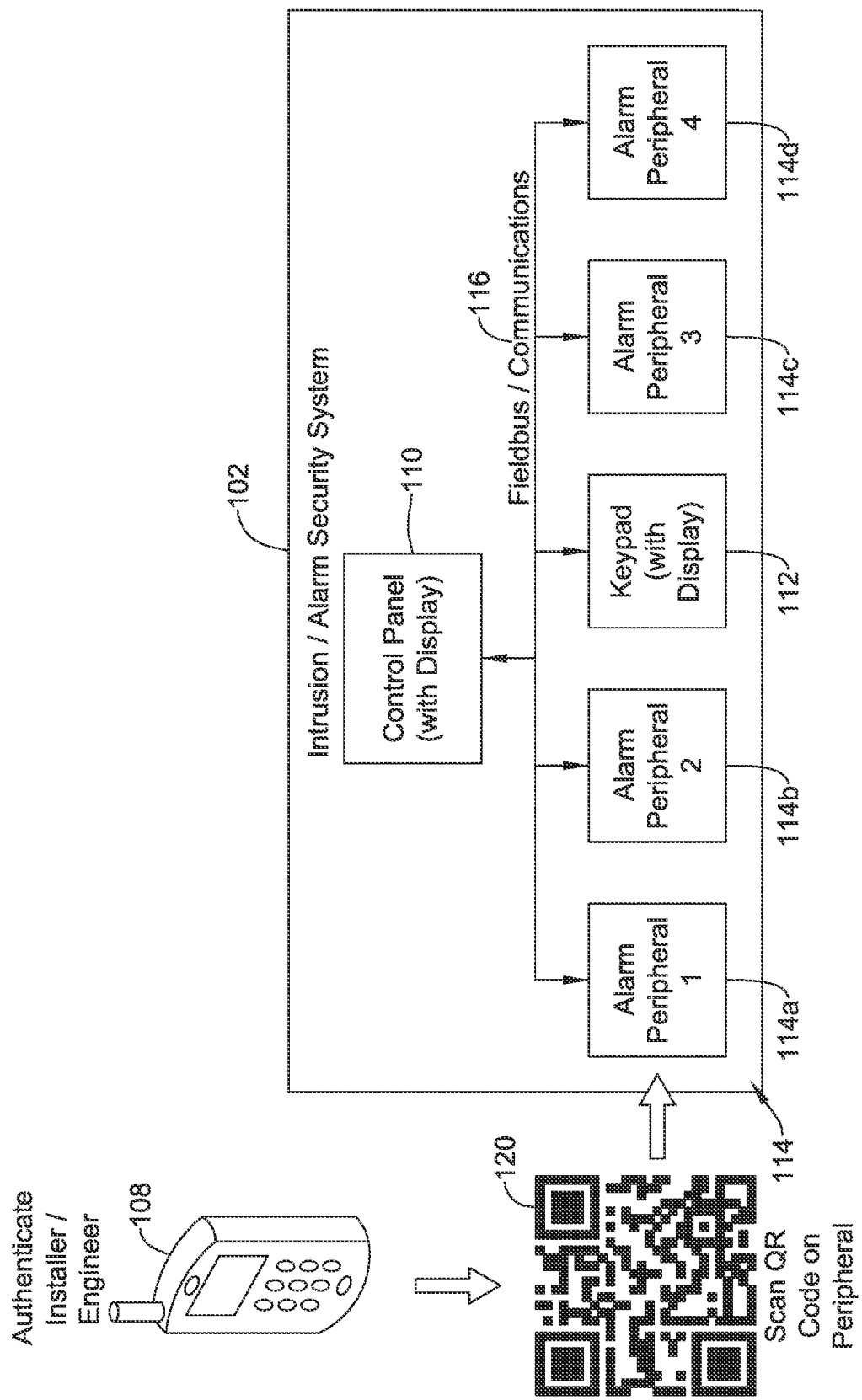
Figure 9:
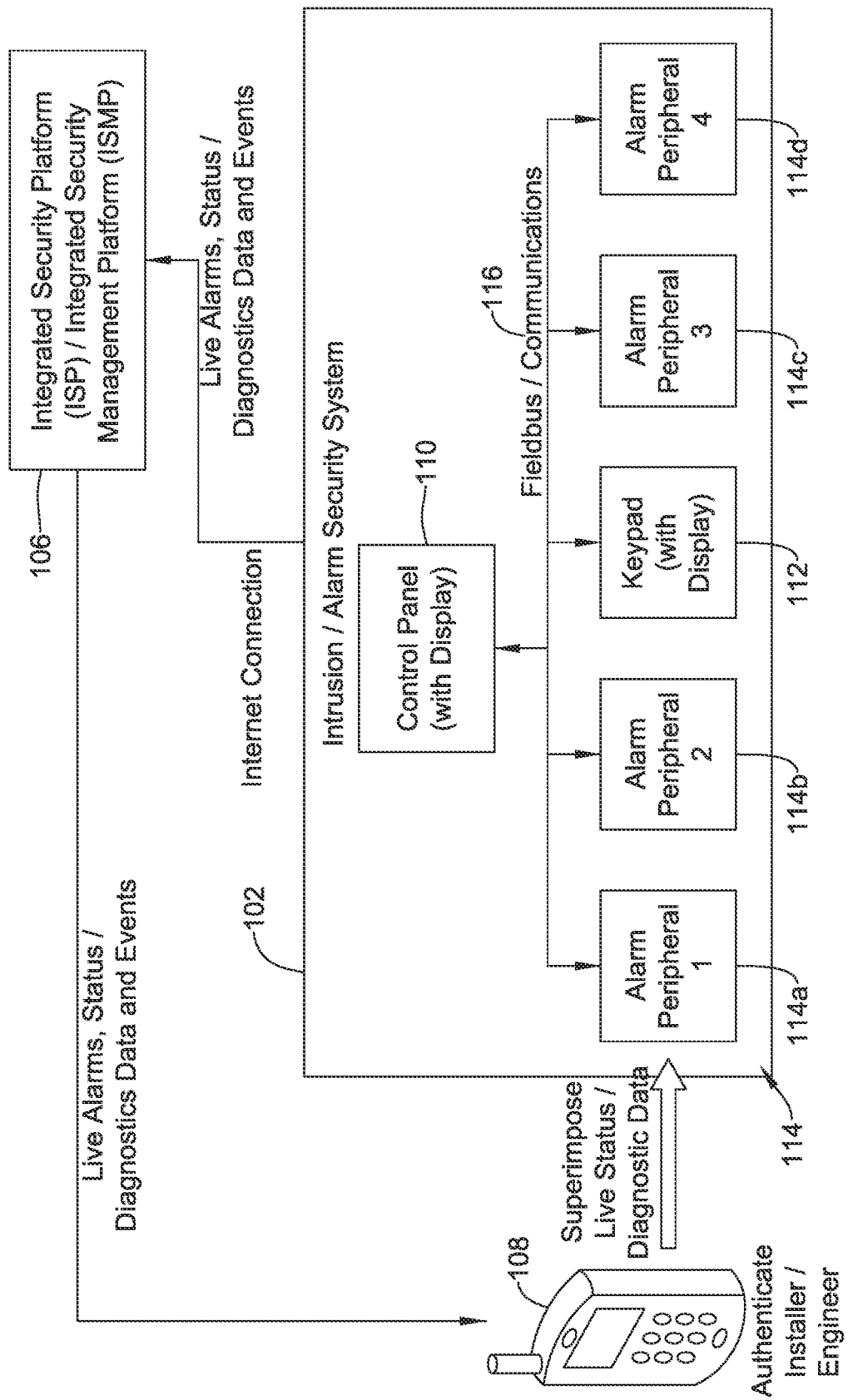

FIGS. 7 through 9 provide a step-by-step example of using a mobile device to diagnose a system or portions of a system. FIG. 7 shows a system 100 that includes an alarm security system 102, an ARC (alarm receiving center) 104 and an ISP (integrated security platform) or ISMP (integrated security management platform) 106. An installer has a mobile device 108, which communicates with the ISP/ISMP 106. The security system 102 includes a control panel 110 and a keypad with display 112. The security system 102 includes a number of peripheral components 114, individually labeled as 114*a*, 114*b*, 114*c* and 114*d*, which may be considered as being examples of the peripheral components 16. The keypad with display 112 and the peripheral components 114 communicate with the control panel 110 via a Fieldbus or Communication bus 116. The alarm security system 102 communicates with the ARC 104 and the ISP/IMSP 106 via a wide area network such as but not limited to the Internet 118.

In Step 1, as illustrated in FIG. 7, the installer or engineer is authenticated through either ISP system credentials or ISMP system credentials. This helps to ensure that the person using the mobile device 108 is authorized to be accessing the data they will be accessing. This minimizes risk of exposing security system data to unauthorized users. Step 2, as shown in FIG. 8, is to identify components. In the example shown, this is done by scanning a QR code 120, which may be considered as being an example of the unique identifier 30. Step 3, as shown in FIG. 9, is to superimpose live peripheral data on an image of the identified component on the mobile device 108.

Figure 10:
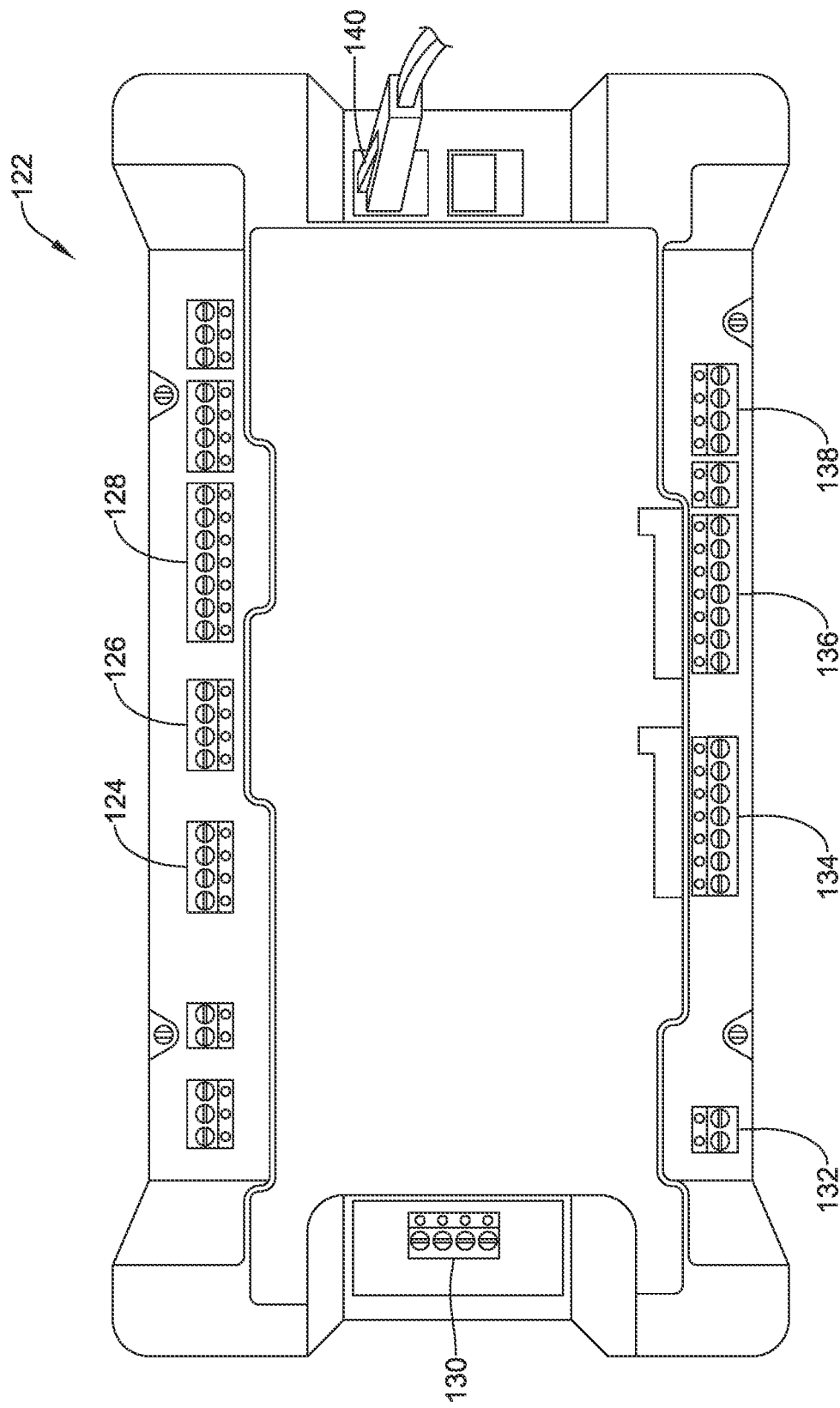
FIG. 10 is a schematic view of an illustrative control system component.

FIG. 10 is an example of an illustrative panel 122 that may be considered as being an example of the component 12. In this example, the panel 122 is a security system panel. The panel 122 includes a number of terminal blocks, including terminal blocks 124, 126, 128, 130, 132, 134, 136 and 138. The panel 122 includes additional terminal blocks that are not expressly labeled. The panel 122 also includes an Ethernet connection 140. The image of the panel 122 may be considered as being a diagnostic image of the panel 122.

Figure 11:
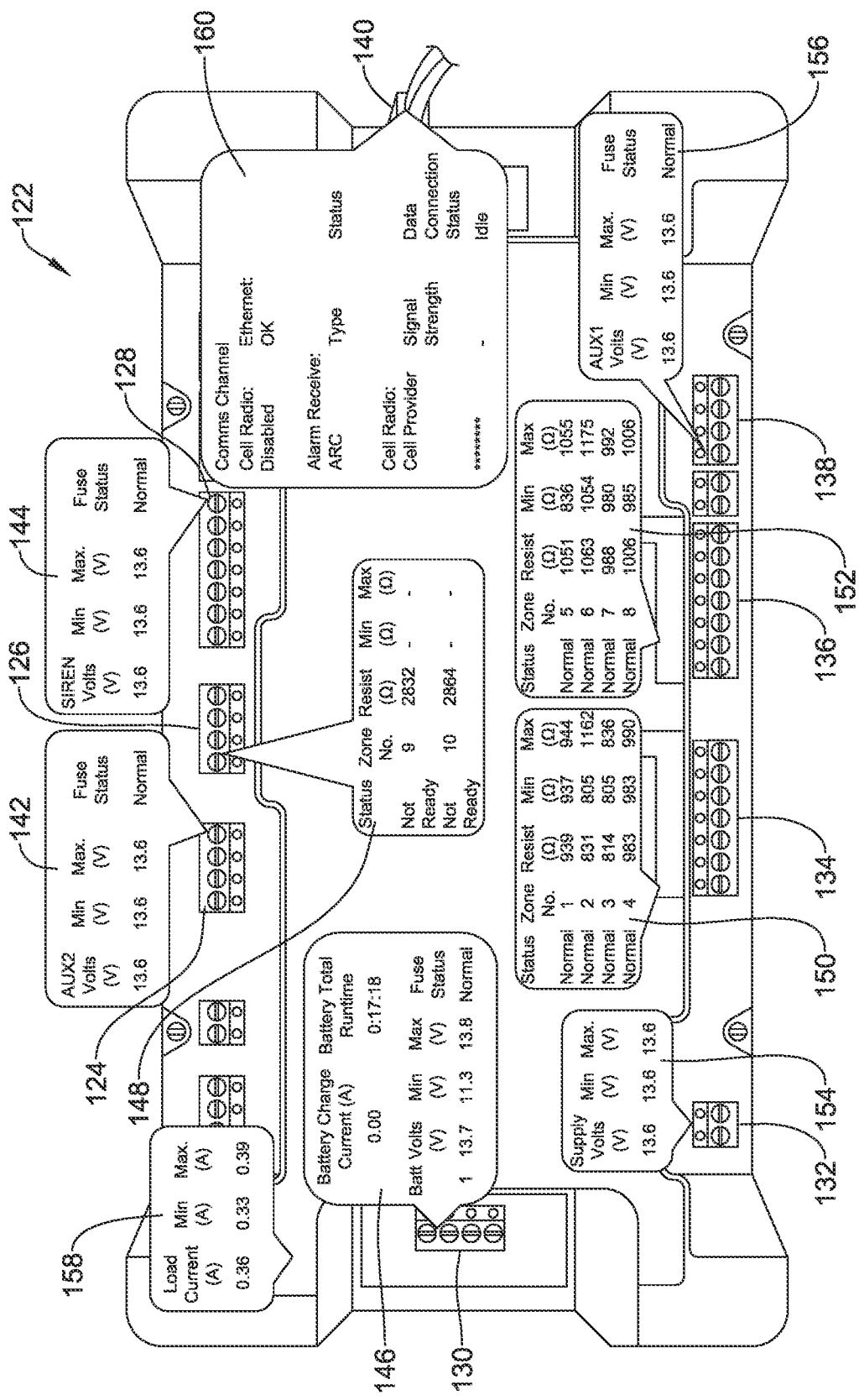
FIG. 11 shows the illustrative control system component of FIG. 11, with electrical parameter values superimposed thereon.

FIG. 11 also shows the diagnostic image of the panel 122, but also includes electrical parameter values, which may be real-time values, superimposed on the diagnostic image of the panel 122. For example, a bubble 142 pointing to one of the wire terminals within the terminal block 124 includes several AUX2 voltage values. A bubble 144 pointing to one of the wire terminals within the terminal block 128 includes several SIREN voltage values.

A bubble 146 pointing to one of the wire terminals within the terminal block 130 provides battery voltage information. A bubble 148 pointing to one of the wire terminals within the terminal block 126 includes zone status/resistance parameters. A bubble 150 pointing to one of the wire terminals within the terminal block 134 includes zone resistance values. A bubble 152 pointing to one of the wire terminals within the terminal block 136 includes zone resistance values. A bubble 154 pointing to one of the wire terminals within the terminal block 132 includes supply voltage data. A bubble 156 pointing to one of the wire terminals within the terminal block 138 includes AUX1 voltage values. A bubble 158 pointing to the panel 122 itself provides current load values. A bubble 160 pointing to the Ethernet connection 140 provides communication status values.

In some cases, some of the bubbles 142, 144, 146, 148, 150, 152, 154, 156 and 158 may be classified into groups. For example, each of the bubbles showing voltages may be grouped together, each of the bubbles showing resistance values may be grouped together. Each bubble within a particular group may be displayed in the same color. This can make it easier for the installer to quickly find the information they are most interested in. In some cases, the installer is able to filter the superimposed information. For example, the installer could choose to only see voltage information, so only bubbles showing voltage information would be shown.

Figure 12:
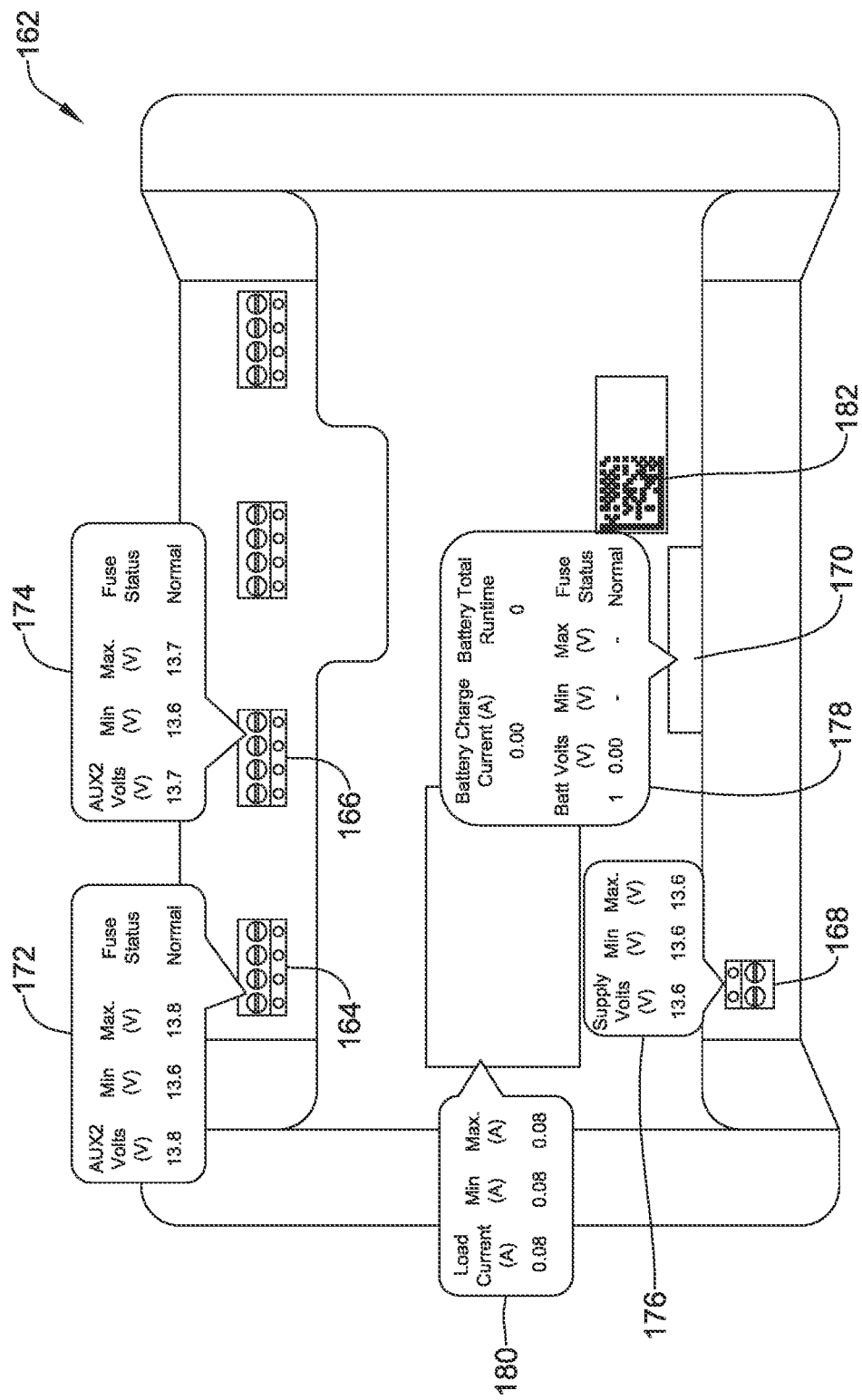
FIG. 12 is a schematic view of an illustrative control system component with electrical parameter values superimposed thereon.

FIG. 12 is an example of a smart remote power supply 162. The smart remote power supply 162 includes a number of terminal blocks, including terminal blocks 164, 166 and 168. The smart remote power supply 162 includes battery terminals 170. A bubble 172 pointing to the terminal block 164 includes AUX1 voltage information. A bubble 174 pointing to the terminal block 166 includes AUX2 voltage information. A bubble 176 pointing to the terminal block 168 includes supply voltage information. A bubble 178 pointing to the battery terminals 170 includes battery charge current information. A bubble 180 pointing to the smart remote power supply 162 provides current load information. The smart remote power supply 162 includes a QR code 182 that may be used to identify the smart remote power supply 162.

Figure 13:
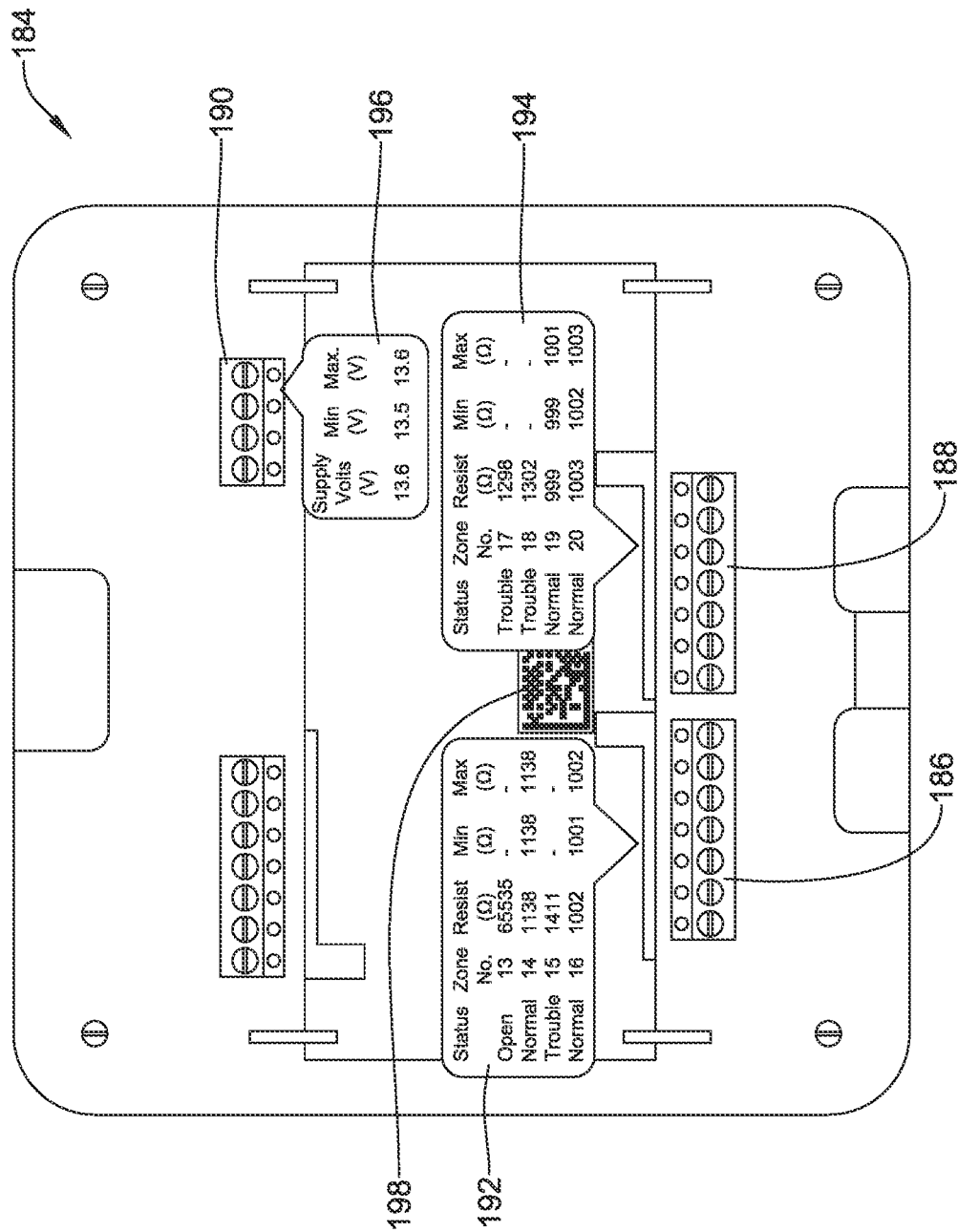
FIG. 13 is a schematic view of an illustrative control system component with electrical parameter values superimposed thereon.

FIG. 13 is an example of a zone expander 184. The zone expander 184 includes a number of terminal blocks, including terminal blocks 186, 188 and 190. A bubble 192 points to the terminal block 186 and includes resistance values for several zones. A bubble 194 points to the terminal block 188 and includes resistance values for additional zones. A bubble 196 points to the terminal block 190 and includes supply voltage values. The zone expander 184 includes a QR code 198 that may be used to identify the zone expander 184.

Those skilled in the art will recognize that the present disclosure may be manifested in a variety of forms other than the specific embodiments described and contemplated herein. Accordingly, departure in form and detail may be made without departing from the scope and spirit of the present disclosure as described in the appended claims.

What is claimed is:

1. A method of using a mobile device for diagnosing a system, the mobile device including a display and a camera, the system including a component having a plurality of wiring terminals for wiring the component to one or more other components of the system, the system configured to identify and report to a remote server one or more real-time electrical parameter values that each correspond to one or more of the wiring terminals of the component, the method comprising:
   using the camera of the mobile device to capture an image of at least part of the component;
   identifying the component based at least in part on the captured image;
   once the component has been identified, the mobile device communicating with the remote server to receive one or more real-time electrical parameter values that correspond to the component;
   displaying a diagnostic image of the component on the display of the mobile device, the diagnostic image showing one or more wiring terminals of the component; and
   superimposing on the diagnostic image one or more of the real-time electrical parameter values received from the remote server, wherein each of the one or more real-time electrical parameter values that is superimposed is positioned adjacent to the corresponding one or more of the wiring terminals.

2. The method of claim 1, wherein using the camera of the mobile device to capture the image of at least part of the component includes capturing an image of a unique identifier displayed on the component.

3. The method of claim 2, wherein the unique identifier comprises a bar code, a QR code and/or an alphanumeric identifier code.

4. The method of claim 1, wherein the diagnostic image comprises a video frame of a real-time video stream, and the method includes repeating the display and superimposing steps over a plurality of video frames.

5. The method of claim 1, wherein the system comprises a security system, and the component comprises a security component of the security system.

6. The method of claim 1, wherein at least one of the real-time electrical parameter values comprises a real-time resistance value.

7. The method of claim 1, wherein at least one of the real-time electrical parameter values comprises a real-time voltage value.

8. The method of claim 1, wherein at least one of the real-time electrical parameter values comprises a real-time current value.

9. The method of claim 1, further comprising:
   applying a filter to the real-time electrical parameter values using filter criteria; and
   superimpose only the real-time electrical parameter values that meet the filter criteria.

10. The method of claim 9, further comprising allowing a user to change the filter criteria.

11. The method of claim 1, further comprising:
   identifying an access level of a user;
   identifying the real-time electrical parameter values that are available to the user based on the access level of the user; and
   superimpose only the real-time electrical parameter values that are available to the user.

12. A method of using a mobile device for diagnosing a system, the mobile device including a display and a camera, the system including a component having a plurality of wiring terminals for wiring the component to one or more other components of the system, the method comprising:
   identifying the component to the mobile device;
   once the component has been identified to the mobile device, the mobile device requesting and receiving one or more electrical parameter values that each correspond to one or more of the wiring terminals of the component;
   displaying a diagnostic image of the component on the display of the mobile device, the diagnostic image including one or more wiring terminals of the component; and
   superimposing on the diagnostic image one or more of the electrical parameter values, wherein each of the one or more electrical parameter values is superimposed adjacent to the corresponding one or more of the wiring terminals.

13. The method of claim 12, wherein at least one of the electrical parameter values comprises a real-time resistance value.

14. The method of claim 12, wherein at least one of the electrical parameter values comprises a real-time voltage value.

15. The method of claim 12, wherein at least one of the electrical parameter values comprises a real-time current value.

16. The method of claim 12, wherein the mobile device requests and receives the one or more electrical parameter values that each correspond to one or more of the wiring terminals of the component from a remote server.

17. The method of claim 12, wherein the mobile device requests and receives the one or more electrical parameter values that each correspond to one or more of the wiring terminals of the component from the component via a wired or wireless connection with the component.

18. The method of claim 12, wherein the mobile device requests and receives the one or more electrical parameter values that each correspond to one or more of the wiring terminals of the component from another component of the system.

19. A method of using a mobile device for diagnosing a system, the mobile device including a display and a camera, the system including a component having a plurality of wiring terminals for wiring the component to one or more other components of the system, the method comprising:
   identifying the component to the mobile device;
   once the component has been identified to the mobile device, the mobile device requesting and receiving one or more real-time electrical parameter values that each correspond to one or more of the wiring terminals of the component; and
   displaying an augmented reality video feed captured by the camera of the mobile device on the display of the mobile device, the augmented reality video feed showing one or more wiring terminals of the component with one or more of the real-time electrical parameter values superimposed adjacent to the corresponding one or more of the wiring terminals.

20. The method of claim 19, further comprising: superimposing a real-time status of one or more sub-components of the component in the augmented reality video feed, wherein the real-time status is superimposed adjacent to a corresponding sub-component in the augmented reality video feed.

\* \* \* \* \*